3,002,013
PREPARATION OF ISOCYANATES
Henry Feuer, Lafayette, Ind., Harry Rubinstein, Wyandotte, Mich., and Arnold T. Nielsen, Lexington, Ky., assignors to Purdue Research Foundation, Lafayette, Ind., a corporation of Indiana
No Drawing. Filed Oct. 8, 1958, Ser. No. 765,922
7 Claims. (Cl. 260—453)

Our invention relates to the production of isocyanates and more particularly to the preparation of mono and poly isocyanato derivatives of saturated hydrocarbons by ozonization of mono and poly isocyano derivatives of saturated hydrocarbons.

Our new process for the production of isocyanates by the interaction of ozone and isocyanides gives good yields of the corresponding isocyanates. No other liquid reaction products remain in solution when the reaction is complete and it is relatively easy to recover the pure isocyanate.

Generally our process consists of passing ozone through isocyanides in either the liquid or vapor phase. Generally we have found that we obtain good yields when ratios of from about 0.5:1 to 10:1 equivalent weights of ozone to isocyanides are used in our process. Generally good yields are obtained when equivalent weights of reactants are used in the process, e.g. when one mole of monoisocyanide is being ozonized one mole of ozone is sufficient, whereas two moles of ozone are required when one mole of a diisocyanide is being ozonized. We prefer to use an excess of ozone as less reaction time is required to obtain good yields.

We can use low concentrations of ozone, on the order of about 1.25% by weight ozone in air or pure oxygen, but we prefer to use concentrations in excess of 5% ozone in pure oxygen as we have found that better yields result from the use of high concentrations of ozone and in continuous processes less recycling of the reactants is required.

The isocyanides useful in our process are the saturated hydrocarbon isocyanides containing up to about twenty carbon atoms. Such isocyanides include methylisocyanide, ethylisocyanide, isopropylisocyanide, octylisocyanide, undecylisocyanide, tetradecylisocyanide, eicosylisocyanide, ethylenediisocyanide, tetramethylenediisocyanide, octamethylenediisocyanide, cyclohexylisocyanide, cycloheptylisocyanide, 1,3-cyclopentyldiisocyanide, 1,3-cyclohexyldiisocyanide, 1,4-cyclohexyldiisocyanide, 1,4-cycloheptyldiisocyanide, 2-methyl-1,2-propanediisocyanide, 4-methyl-2,4-pentanediisocyanide, 2,3-dimethyl-2,3-butanediisocyanide, 2,2-dipropyl-1,3-propanediisocyanide, 1,2-octadecyldiisocyanide, 5,6-dodecyldiisocyanide, 2,4,6-hexanetriisocyanide and 2,4-dimethyl-2,4,6-heptanetriisocyanide, etc.

These saturated hydrocarbon isocyanides are easily prepared by the processes of U.S. Patents 2,347,772 and 2,342,794 and the similar process of Malatesta, L. Gazz. Chim. Ital., 77, 238–240 (Chem. Abst. 42, 869 g.).

We have found that our process is operative at temperatures ranging from about −10° to about 75° C. The reaction time is dependent to a large extent on the reaction temperature and we prefer to use temperatures on the order of about 25–30° C. where possible as the reaction period is considerably reduced at these temperatures. When the more volatile isocyanides, such as ethylisocyanide, are being ozonized in the liquid phase we prefer to use temperatures on the order of about 0° C. and to carry out the reaction in a solvent solution in order to reduce the volatilization of the isocyanide, though this means that the time necessary for carrying out the reaction is considerably extended.

As noted, solvents are sometimes required to keep the highly volatile isocyanides in solution. Said solvents must be inert to both reactants and the final isocyanate products. These solvents include halogenated hydrocarbons such as ethylene chloride, carbontetrachloride, etc.; saturated hydrocarbons, such as octane, cyclohexane, etc.

When high concentrations of ozone are available, the process can be carried out in the vapor phase with good results but generally, we prefer to carry out our process in the liquid phase as shorter reaction times and better yields result therefrom.

The following examples further illustrate our invention but it is not intended that our invention be limited to the reactants, temperatures, portions, etc., but rather it is intended that all equivalents obvious to those skilled in the art be included in the scope of our invention.

*Example I*

Ozone from an ozonizer similar to the one described by A. L. Henne and Warren P. Perilstein, J.A.C.S., 65, p. 2183 (1943), operated at 15 kv. was passed into a sealed Pyrex reactor containing 0.081 mole n-octylisocyanide. Approximately 0.25 mole ozone in 272 liters of oxygen was incrementally introduced into the n-octylisocyanide over a 25 hour period. Volatiles from the reaction were collected in a Dry-Ice acetone trap. The reaction mixture was maintained at 25° throughout the reaction period. After completion of the reaction the isocyanate was converted to n-octylurea with ammonia and a 73.5% conversion of isocyanide, based on the urea which precipitated from solution, was recovered. This corresponds to an 82% yield of n-octylisocyanate.

*Example II*

The apparatus of Example I was used to prepare ethylisocyanate. An ethylene chloride solution containing 0.105 mole of ethylisocyanide was ozonized at 0° C. with 0.1 mole of ozone contained in 85 liters of oxygen. At the end of the 10 hour reaction period the isocyanate was converted to ethyl urea with ammonia and the urea recovered by crystallization. An 83% yield of ethylisocyanate, based on ethylurea, was recovered.

*Example III*

The apparatus of Example I was used to prepare n-hexylisocyanate. Ozone, 0.15 mole, contained in 199 liters of oxygen was passed into n-hexylisocyanide at 25° over a 15 hour period. At the end of the reaction period, the n-hexylisocyanate was converted with ammonia to the n-hexyl urea, which precipitated from solution. It was determined that a 55% conversion, amounting to a yield of 88% isocyanate, based on n-hexyl urea, was recovered.

*Example IV*

To prepare 1,6-hexamethylenediisocyanate, the apparatus of Example I was used to interact 0.2 mole of 1,6-hexamethylenediisocyanide with ozonated oxygen containing 0.5 mole ozone at 30° C. The diisocyanate is recovered by distillation at reduced pressure in good yield.

*Example V*

The process of Example IV and apparatus of Example I was used to prepare 1,4-cyclohexanediisocyanate in a carbon tetrachloride solution.

Now having described our invention, what we claim is:

1. In a process for the preparation of isocyanato derivatives of saturated hydrocarbons containing from 1 to 3 isocyanato groups inclusive, the steps of interacting ozone and corresponding isocyanide derivatives of saturated hydrocarbons containing from 1 to 3 isocyanide groups inclusive the said hydrocarbons containing up to about 20 carbon atoms at about −10° to about 75° C. and recovering the thus produced isocyanato derivatives.

2. A process for the preparation of isocyanato derivatives of saturated hydrocarbons containing from 1 to 3 isocyanato groups inclusive which comprises interacting ozone and isocyanide derivatives of saturated hydrocarbons containing from 1 to 3 isocyanide groups inclusive the said hydrocarbons containing up to about twenty carbon atoms at about −10° to about 75° C. and at reactant ratio of from about 0.5:1 to 10:1 equivalent weights of ozone to isocyanides and recovering the thus prepared isocyanato derivatives.

3. The process of claim 2 wherein the isocyanide is ethylisocyanide.

4. The process of claim 2 wherein the isocyanide is tetramethylenediisocyanide.

5. The process of claim 2 wherein the isocyanide is 1,3-cyclohexyldiisocyanide.

6. The process of claim 2 wherein the isocyanide is 1,4-cyclohexyldiisocyanide.

7. The process of claim 2 wherein the isocyanide is 2,4-dimethyl-2,4,6-heptanetriisocyanide.

References Cited in the file of this patent

Bennett: "Concise Chemical and Technical Dictionary," 1947, page 26.

Migrdichian: "The Chemistry of Organic Cyanogen Compounds," 1947, page 393.

Groggins: "Unit Processes in Organic Synthesis," fourth ed., 1952, page 429.

Feuer et al.: J. Org. Chem., volume 23, No. 8 (August 1958), pages 1107–1109.